United States Patent
Zhang et al.

(10) Patent No.: US 9,565,101 B2
(45) Date of Patent: Feb. 7, 2017

(54) RISK MITIGATION IN DATA CENTER NETWORKS

(71) Applicant: Fujitsu Limited, Kanagawa (JP)

(72) Inventors: Qiong Zhang, Plano, TX (US); Qingya She, Plano, TX (US); Xi Wang, Murphy, TX (US); Paparao Palacharla, Richardson, TX (US); Motoyoshi Sekiya, Richardson, TX (US)

(73) Assignee: Fujitsu Limited, Kawasaki (JP)

(*) Notice: Subject to any disclaimer, the term of this patent is extended or adjusted under 35 U.S.C. 154(b) by 184 days.

(21) Appl. No.: 14/102,313

(22) Filed: Dec. 10, 2013

(65) Prior Publication Data

US 2014/0317257 A1    Oct. 23, 2014

Related U.S. Application Data

(60) Provisional application No. 61/814,532, filed on Apr. 22, 2013.

(51) Int. Cl.
*H04L 12/715* (2013.01)
*H04L 12/24* (2006.01)

(52) U.S. Cl.
CPC ............ *H04L 45/64* (2013.01); *H04L 41/042* (2013.01); *H04L 41/145* (2013.01)

(58) Field of Classification Search
CPC ............ H05K 7/20836; H05K 7/20745; H05K 7/20136; H05K 7/2079; H05K 7/20827; H04L 41/042; H04L 41/145; H04L 45/64; H04L 12/715; H04L 12/24

See application file for complete search history.

(56) References Cited

U.S. PATENT DOCUMENTS

| | | | |
|---|---|---|---|
| 6,557,123 B1* | 4/2003 | Wiencko, Jr. | G06F 11/1076 711/114 |
| 7,149,797 B1* | 12/2006 | Weller et al. | 709/223 |
| 7,653,689 B1* | 1/2010 | Champagne et al. | 709/206 |
| 8,108,502 B2* | 1/2012 | Tabbara et al. | 709/223 |
| 8,160,063 B2* | 4/2012 | Maltz et al. | 370/389 |
| 8,229,785 B2* | 7/2012 | Fung et al. | 705/7.12 |
| 8,422,399 B2* | 4/2013 | Gorman | 370/254 |
| 8,665,886 B2* | 3/2014 | Gupta et al. | 370/401 |
| 8,837,491 B2* | 9/2014 | Huynh Van et al. | 370/395.31 |
| 8,983,675 B2* | 3/2015 | Dawson et al. | 700/300 |
| 2007/0112585 A1* | 5/2007 | Breiter | G06F 19/12 705/2 |

(Continued)

OTHER PUBLICATIONS

J. Xiao et al., "Data Center Network Placement and Service Protection in All-Optical Mesh Networks", 2013 9th International Conference on the IEEE, pp. 88-94, Mar. 4, 2013.

(Continued)

*Primary Examiner* — Sargon Nano
(74) *Attorney, Agent, or Firm* — Baker Botts L.L.P.

(57) ABSTRACT

A method employing resource orchestration algorithms may find a fewest number of working data centers (DCs) to guarantee K-connect survivability using an overlay network representing a physical optical network. The overlay network may not include certain topological features of the physical optical network. A risk-based algorithm may result in fewer working DCs for K-connect survivability. A delay-based algorithm may be more suitable for delay-sensitive cloud applications.

18 Claims, 7 Drawing Sheets

(56) References Cited

U.S. PATENT DOCUMENTS

| | | | |
|---|---|---|---|
| 2007/0153782 A1* | 7/2007 | Fletcher et al. | 370/389 |
| 2007/0288247 A1* | 12/2007 | Mackay | 705/1 |
| 2008/0155061 A1* | 6/2008 | Afergan et al. | 709/218 |
| 2008/0163824 A1* | 7/2008 | Moser | G06F 19/18 119/174 |
| 2010/0332373 A1* | 12/2010 | Crabtree et al. | 705/37 |
| 2013/0306276 A1* | 11/2013 | Duchesneau | G06F 9/5072 165/104.21 |

OTHER PUBLICATIONS

T. Li and B. Wang, "Approximating Optimal Survivable Scheduled Service Provisioning in WDM Optical Networks with Shared Risk Link Groups", 4th International Conference on IEEE, 10 pages, Sep. 10, 2007.

C. Develder et al., "Resilient network dimensioning for optical grid/clouds using relocation", New Trends in Optical Networks Survivability, pp. 6262-6267, Jun. 10, 2012.

Extended European Search Report issued in EP Patent Appl. No. 14156612.5-1853; 8 pages, Feb. 17, 2015.

C. Develder ct al., "Survivable optical grid dimensioning: anycast routing with server and network failure protection", Proc. ICC 2011, 5 pages, 2011.

J. He, "Software-defined Transport Network for Cloud Computing", OFC 2013, 3 pages, 2013.

D. Simeonidou et al., "Software Defined Optical Networks Technology and Infrastructure: enabling Software-Defined Optical Network Operations", OFC 2013, 3 pages, 2013.

E. Vollset et al., "Scribble: an Efficient. Reliable Manycast protocol for Ad-hoc Networks", Proc. IEEE Conference on Mobile Ad-hod and Sensor Systems, 3 pages, 2004.

G. Wang et al., "Programming Your Network at Run-time for Big Data Applications", Proc. HotSDN 2012, 6 pages, 2012.

J. Weinman, "Axiomatic Cloud Theory", [Online], 29 pages, http://www.joeweinman.com/Resources/Joe_Weinman_Axiomatic_Cloud_Theory.pdf, Jul. 29, 2011.

Y. Zhu et al., "Algorithms for Assigning Substrate Network Resources to Virtual Network Components", Proc. INFOCOMM 2006, 12 pages, 2006.

U.S. Appl. No. 14/470,265, filed Aug. 27, 2014, 30 pages, Aug. 27, 2014.

Q. Zhang et al., "Survivable resource orchestration for optically interconnected data center networks", Optics Express, 22(1):23-29. Dec. 20, 2013.

* cited by examiner

RISK MITIGATION IN DATA CENTER NETWORKS

CROSS-REFERENCE TO RELATED APPLICATION

This application claims priority from U.S. Provisional Application No. 61/814,532 filed Apr. 22, 2013, which is hereby incorporated by reference.

BACKGROUND

Field of the Disclosure

The present disclosure relates generally to data center networks and, more particularly, to risk mitigation in data center networks.

Description of the Related Art

As more applications and workloads are moving to online network computing resources, also generally referred to as 'the cloud', geographically distributed data centers (DCs) are being deployed across wide-area networks, including optical networks. Such data centers may provide various instances of virtual machines (VMs) that may individually instantiate a computing environment, such as a server operating system, for example. Cloud applications may rely on distributed DCs for improved user experience. However, some cloud service providers may not own optical network infrastructure and may count on network providers to optically interconnect distributed DCs. Some network providers may be unwilling and/or unable to expose their full network topology information to cloud service providers.

Many cloud applications in distributed DCs are arranged in an aggregation communication pattern, whereby an aggregation DC collects data processed at distributed DCs and outputs final results to users. Cloud applications can make physically dispersed VMs operate logically as one DC by collecting results from dispersed VMs at an aggregation DC. Other applications, such as cloud search and data backup, for example, can allocate VMs close to data stored in distributed DCs and provide results at an aggregation DC for access by users. In certain instances, complicated communication patterns can be constituted by scheduling a sequence of data aggregations.

Due to the reliance on distributed DCs and aggregation DCs, survivability in the face of various risks, such as network outages, DC failure(s), and/or equipment failure, among other examples, is becoming an important issue for cloud applications. Accordingly, there is a need in the art for an overlay framework that enables cloud service providers to control cloud network connections and optimize resource orchestration, yet enables network operators to offer network services while retaining detailed network topology information.

SUMMARY

In one aspect, a disclosed method for identifying a smallest M number of data centers (DCs) for K-connect survivability includes generating a risk matrix associated with an aggregation DC included in an overlay network, sorting the DC-connection pairs according to a risk criteria, and setting M equal to K+1 (M=K+1). The risk matrix may indicate which of N number of DC-connection pairs are associated with which of L number of shared risk groups (SRGs) in the overlay network. A DC-connection pair may represent a connection in the overlay network to a DC from the aggregation DC. The method may include, in iteration over each value of M: evaluating, in an increasing sorted order of the risk criteria, a risk vector for each of the DC-connection pairs to determine whether a DC-connection pair is selected, and, when less than M number of DC-connection pairs are selected, incrementing M. The risk vector may be based on the risk matrix and/or on previously selected DC-connection pairs. The method may further include identifying the M number of DCs included in the M number of DC-connection pairs selected. K may represent a minimum number of DCs that remain accessible to the aggregation DC. The overlay network may represent a physical network.

Additional disclosed aspects for identifying a smallest M number of data centers (DCs) for K-connect survivability include an article of manufacture comprising a non-transitory, computer-readable medium, and computer executable instructions stored on the computer-readable medium. A further aspect includes a management system comprising a memory, a processor coupled to the memory, and computer executable instructions stored on the memory.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

Figure 1:
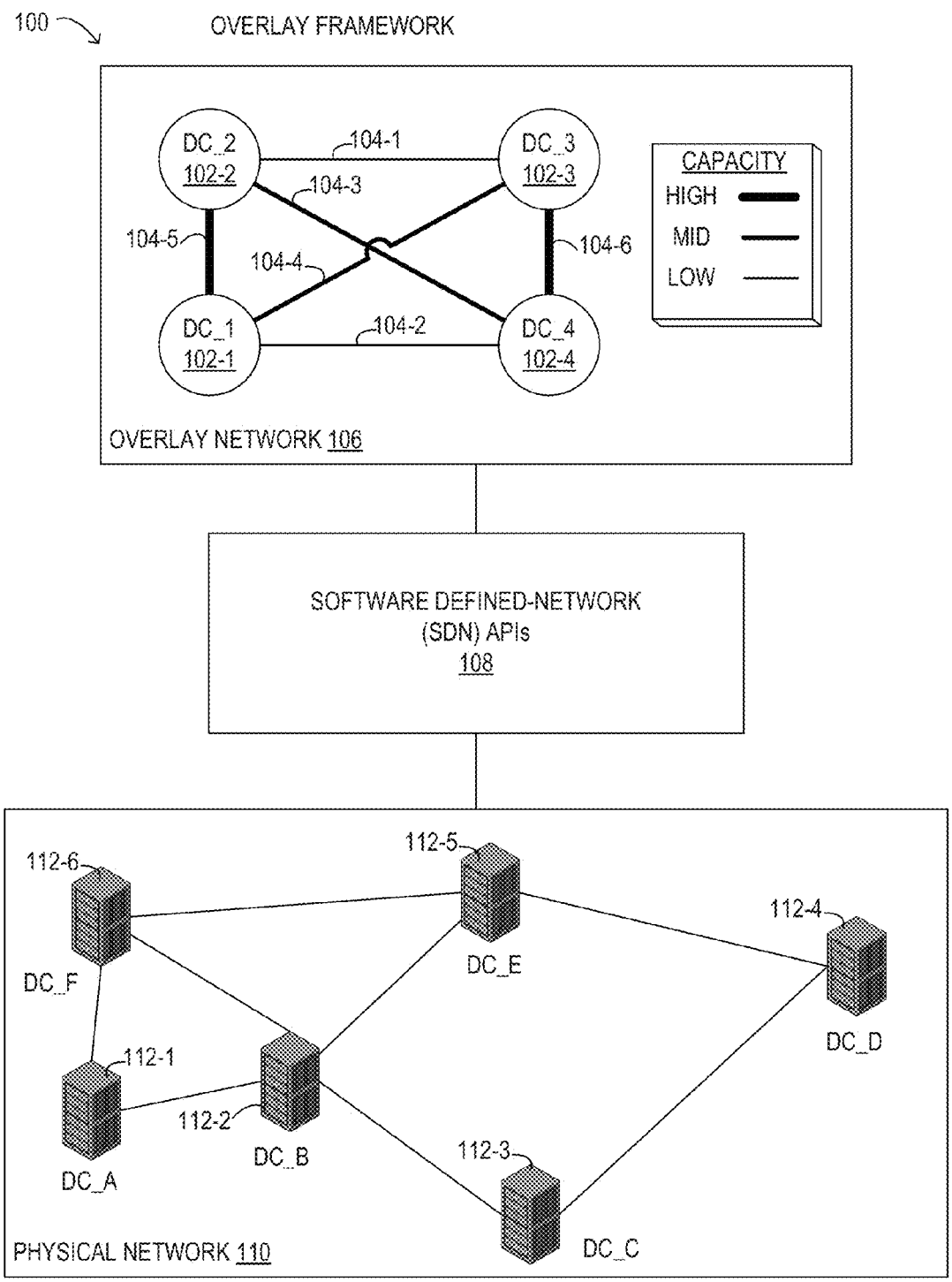
FIG. 1 is a block diagram of selected elements of an embodiment of an overlay framework.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), widget "12-1" refers to an instance of a widget class, which may be referred to collectively as widgets "12" and any one of which may be referred to generically as a widget "12". In the figures and the description, like numerals are intended to represent like elements.

As will be described in further detail herein, a K-connect survivability concept is disclosed that may guarantee resource availability under a wide range of risks for cloud applications. Two resource orchestration schemes are disclosed that may implement the K-connect survivability concept in an overlay framework for optical network virtualization. The resource orchestration schemes may identify a fewest number of data centers for guaranteeing K-connect survivability, where K represents a minimum number of DCs that remain accessible from an aggregation DC. The following parameters in Table 1, which are integers greater than zero, are used herein with respect to K-connect survivability.

TABLE 1

Parameters used for K-connect survivability.

| Parameter | Description |
|---|---|
| K | A minimum number of DCs that remain accessible to an aggregation DC |
| L | A number of shared risk groups (SRGs) in an overlay network |
| M | A minimum number of working DCs for satisfying K-connect survivability |
| N | A number of shared risk groups (SRG) |

A K-connect survivability (KCS) may be defined by a scenario where at least K number of DCs (out of M original working DCs) are reachable from an aggregation DC ($DC_a$) for an arbitrary risk, such as, but not limited to, network outages, DC failure(s), and/or other types of equipment failure (also referred to herein collectively as "risk events"). For the purposes of the present disclosure, it may be assumed that $DC_a$ does not fail. A risk event may result in multiple failures that may occur at DC sites (e.g., due to power outages, natural disasters, and/or system maintenance) or in networks (due to fiber cuts). For cloud applications requesting a fixed number of VMs, additional VMs can be allocated at the surviving K number of DCs in order to maintain the same number of virtual machines during a risk-event scenario as during normal operation.

As will be described herein, an overlay framework is presented that interconnects distributed data centers by virtualized optical networks. Survivable resource orchestration algorithms, based on the network information provided by the virtualized optical networks, such as shared risk groups (SRG) and delay, are disclosed. The disclosed resource orchestration algorithms may find a fewest number of working DCs to ensure K-connect survivability. The resource orchestration algorithms disclosed herein may provision the fewest number of working DCs based on SRG information provided for overlay networks, where physical network topology may be unavailable and routing for connections may not be possible.

Turning now to the drawings, FIG. 1 illustrates an example embodiment of overlay framework 100, which may be based on optical network virtualization. In FIG. 1, overlay framework 100 is shown including overlay network 106, software defined-network (SDN) application programming interfaces (APIs) 108, and physical network 110. As shown, overlay network 106 may comprise connections 104 between DCs 102, where a bandwidth of connections 104 may be adjustable using optical network virtualization. In FIG. 1, an underlying optical network, represented by physical network 110, may be an optical transport network (OTN) and/or a flexible optical data plane (e.g., flexible transceivers) configured to adjust the bandwidth of connections.

In FIG. 1, overlay network 106 is shown comprising virtualized DCs 102 and connections 104. In certain embodiments, DCs 102 may correspond to physical DCs 112; for example, DC_1 102-1 may represent DC_A 112-1, DC_2 102-2 may represent DC_F 112-6, DC_3 102-3 may represent DC_E 112-5, and DC_4 102-4 may represent DC_C 112-3, while DC_B 112-2 and DC_D 112-4 may not be explicitly included in overlay network 106. In other embodiments, DCs 102 may include computing resources from one or more physical DCs 112, and may represent virtualized DCs; for example, DC_1 102-1 may represent at least portions of DC_A 112-1 and DC_B 112-2, etc. It will be understood that other arrangements and configurations of mapping DCs 112 in physical network 110 to DCs 102 in overlay network 106 may be practiced in different embodiments. Furthermore, connections 104 may represent virtualized connections having a given capacity for transporting data. As shown, connections 104-1 and 104-2 may represent low capacity connections, connections 104-3 and 104-4 may represent mid capacity connections, while connections 104-5 and 104-6 may represent high capacity connections. Although connections 104 are shown in overlay network connecting two DCs 102, connections 104 may be physically implemented using various network topologies, and may actually represent physical connections that include different nodes and/or network segments. However, to a cloud service provider using overlay network 106 as an operational network platform, the actual physical topology may remain hidden and/or may change over time.

Cloud service providers may have a centralized controller (not shown in the drawings) that manages VMs at DCs interconnected by overlay network 106. The centralized controller (also referred to herein simply as "the controller") may obtain network information, such as delay and SRG of connections, and may request the bandwidth of connections through network application programming interfaces (APIs) with the help of network control and management tools, such as software-defined networks (SDN). As shown in overlay framework 100, SDN APIs 108 may represent software tools for enabling a user (e.g., a cloud provider) of overlay network 106 to query network information. It is noted that overlay framework 100 may enable network providers of physical network 110 to keep detailed physical network topology information hidden, while allowing cloud service providers to easily set up cloud services, to perform resource orchestration, and to flexibly increase or reduce the bandwidth of connections. The cloud providers may use SDN APIs 108 to query certain specific attributes for DCs 102 and/or connections 104 in overlay network 106, without having knowledge of the specific network topology of physical network 110, and/or without direct interaction with hidden components in physical network 110, such as intermediate network devices along connection paths 104 that are not included in overlay network 106.

Figure 2A:
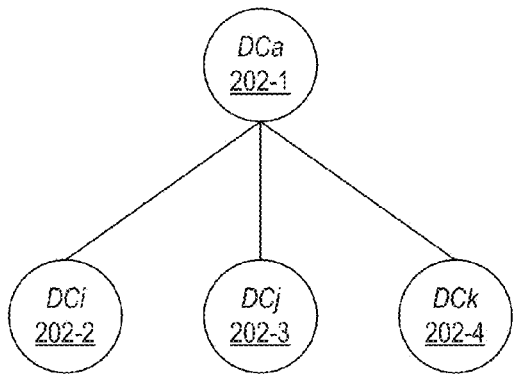
FIG. 2A is a block diagram of selected elements of an embodiment of an aggregation request.
Figure 2B:
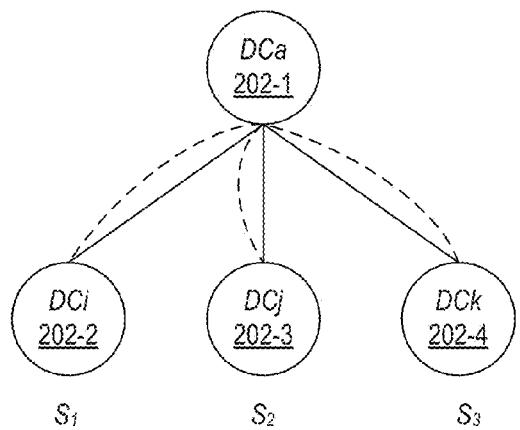
FIG. 2B is a block diagram of selected elements of an embodiment of separate protection of an aggregation data center.
Figure 2C:
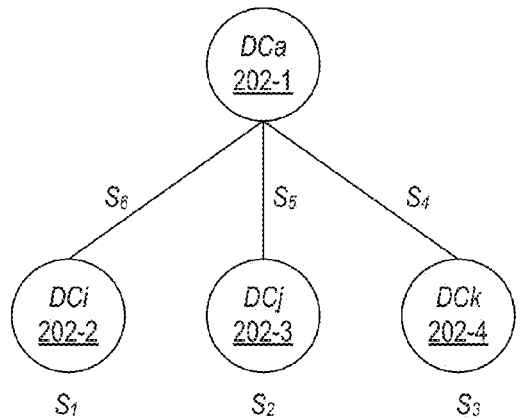
FIG. 2C is a block diagram of selected elements of an embodiment of joint protection of an aggregation data center.

Turning now to FIGS. 2A, 2B, and 2C, example embodiments of aggregation requests 200 and corresponding protection schemes are illustrated in diagram form. The controller may receive cloud requests and may perform resource orchestration. In one example embodiment. As shown in FIG. 2A, aggregation request 200-1 may illustrate how aggregation $DC_a$ 202-1 handles a basic request, for example, via the controller, by aggregating data from DC, 202-2, $DC_j$ 202-3, and $DC_k$ 202-4. More complicated requests may be generated using a combination of basic requests and/or sets of basic requests. A request may satisfy K-connect survivability and may be associated with a given number of VMs (V) for risk events. When a risk event occurs, a request with K-connect survivability may allocate additional VMs at the surviving K DCs out of M number of working DCs in order to maintain V number of VMs. Assuming that each DC is allocated the same number of VMs for a request, the total VMs for a request with K-connect survivability may be given by V*M/K. Accordingly, finding the fewest M number of DCs that satisfy K-connect survivability results in the fewest VMs required for a request.

Guaranteeing K-connect survivability may save network cost by jointly considering information from physical networks and DCs. In FIG. 2B separate (blind) protection 200-2 shows an example where $s_i$ indicates risk i and network connections may be blindly protected by providing path-disjoint connections (dotted lines) from aggregation $DC_a$ 202-1. In FIG. 2B, K-connect survivability for K=2 (i.e., 2-connect survivability) may be guaranteed by protecting against risk events at DCs separately from the network connections, which may result in 6 connections in separate protection 200-2. In FIG. 2C, joint protection 200-3 illustrates, by using shared risk group (SRG) information from underlying optical networks, how 2-connect survivability may be guaranteed by finding network connections and DCs that can be jointly protected. For example, risks $S_1$ and $S_6$ may be joined in one SRG, risk $S_2$ and $S_5$ may be joined in a second SRG, and risks $S_3$ and $S_4$ may be joined in a third SRG. In joint protection 200-3, significant savings in network resources may be achieved by having 3 connections, representing a savings of 3 protection connections as compared to FIG. 2B.

Using SDN APIs 108 (see FIG. 1), a subset of DCs with minimum delay may be identifiable when multiple subsets of DCs that satisfy K-connect survivability exist. A delay of a request may be given by a total delay of connections between the subset of DCs and the aggregation DC ($DC_a$). It is noted that $DC_a$ may be allocated to a DC that is relatively near to users or relatively near to a particular subset of DCs, depending on specific applications.

Based on FIGS. 2A, 2B, and 2C, the following problem description may be applied to the methods for K-connect survivability based on aggregation and protection schemes 200.

GIVEN: An overlay network has N number of DC sites and a set of L shared risk groups (SRGs) for risks $S=\{s_1, s_2, \ldots, s_l, \ldots, s_L\}$. In the overlay network, each connection $E_{ij}$ between $DC_i$ and $DC_j$ has network information including delay, $d_{ij}$, and a vector of associated SRGs, $A_{ij}=\{\alpha_{ij1}, \alpha_{ij2}, \ldots, \alpha_{ijl}, \ldots, \alpha_{ijL}\}$, where $\alpha_{ijl}=1$ indicates that $s_l$ is associated with $E_{ij}$; otherwise $a_{ijl}=0$. Similarly, each $DC_i$ is associated with a set of SRGs, $A_i$. Also, a request is received that requires K DCs to be connected to an aggregation $DC_a$, even during a risk event.

FIND: At least M number of working DCs such that:
1) $\min \Sigma(d_{aj})$, where $1 \leq j \leq M$, which minimizes a total delay associated with a request; and
2) K number of DCs remain connected to $DC_a$ even during a risk event, which guarantees K-connect survivability (KCS).

As will now be described in further detail, two heuristic algorithms are disclosed for solving the KCS problem in optically interconnected distributed DC networks. In both algorithms, a risk matrix may be constructed for each aggregation $DC_a$. For each $s_1$, the risk matrix records 1 if a pair ($p_{ij}$) consisting of a connection $E_{ij}$ and a $DC_j$ is associated with risk $s_1$. In both algorithms described below, Table 2 shows the values for parameters associated with an overlay network (not shown) that are assumed.

TABLE 2

Parameters for K-connect survivability example algorithms.

| Parameter | Value |
| --- | --- |
| K-connect survivability DCs | K = 2 |
| Number of aggregation data centers $DC_a$ | a = 1 |
| Set of DCs in overlay network besides $DC_a$ | j = {2, 3, 4, 5} |
| Set of SRGs | l = {1, 2, 3, 4, 5} |
| Number of SRGs needed for KCS | N = 3 |

Table 3 shows an exemplary risk matrix constructed for an arbitrary $DC_1$ corresponding to the example of Table 2. The delay of $p_{ij}$ is $d_{ij}$ and the set of risks associated with $p_{ij}$ is the union of $A_{ij}$ and $A_i$. The values in Table 3 may be queried, for example, using SDN APIs 108 (see FIG. 1) based on a corresponding overlay network (not shown).

TABLE 3

Risk Matrix for $DC_1$.

| $\alpha_{ijl}$ | $p_{12}$ | $p_{13}$ | $p_{14}$ | $p_{15}$ |
| --- | --- | --- | --- | --- |
| $s_1$ | 1 | 0 | 0 | 0 |
| $s_2$ | 0 | 1 | 1 | 0 |
| $s_3$ | 0 | 1 | 0 | 0 |
| $s_4$ | 1 | 1 | 0 | 0 |
| $s_5$ | 0 | 0 | 0 | 1 |

A risk vector ($\#p_l$) may additionally be used to record a number of currently chosen pairs that are associated with $s_l$ and may be initialized to zero.

Algorithm A1—Delay-Based:

For finding at least M number of working DCs, M is incremented from K+1. For each M, with $DC_a$ as an aggregation DC, sort $p_{aj}$ in an increasing order of delay. Risk vector $\#p_l$ is incremented by 1 if a $p_{aj}$ is chosen and $\alpha_{ajl}=1$. A $p_{aj}$ can be chosen if and only if risk vector $\#p_l \leq (M-K)$ for all risks $s_l$ with $\alpha_{ajl}=1$. If M pairs are found, stop incrementing M. Finally, the highest M represents the fewest number of working DCs that satisfies K-connect survivability.

An example embodiment of algorithm A1 corresponding to the values in Table 2 and Table 3 above will now be described in detail. For delay-based algorithm A1, it will be assumed that for pair $p_{ij}$, delay $d_{ij}$ increases in a delay order given by $\{p_{12}, p_{14}, p_{13}, p_{15}\}$, which represents an order in which pairs $p_{ij}$ are selected for processing. Algorithm A1 is described below using pseudo code that roughly corresponds to instructions executable by a processor, yet incorporates prosaic text for human readability and understanding.

Algorithm A1: Delay-based K-connect survivability evaluation in pseudo code.

A1-100: begin main loop iterating over M, no pairs selected
A1-110: set number of pairs to select M = 3, so (M − K) = 1
A1-120: evaluate $p_{12}$ based on delay order
A1-130: evaluate $\#p_1[1] = \{1, 0, 0, 1, 0\}$, so $\#p_1[1] \leq (M - K)$
A1-140: select first pair $p_{12}$
A1-150: evaluate $p_{14}$ based on delay order
A1-160: evaluate $\#p_1[2] = \{1, 1, 0, 1, 0\}$, so $\#p_1[2] \leq (M - K)$
A1-170: select second pair $p_{14}$

| Algorithm A1: Delay-based K-connect survivability evaluation in pseudo code. |
|---|
| A1-180: evaluate $p_{13}$ based on delay order |
| A1-190: evaluate #$p_I$[3] = {1, 2, 1, 2, 0}, so #$p_I$[3] not ≤ (M − K) |
| A1-200: skip pair $p_{13}$ |
| A1-210: evaluate $p_{15}$ based on delay order |
| A1-220: evaluate #$p_I$[4] = {1, 1, 0, 1, 1}, so #$p_I$[4] ≤ (M − K) |
| A1-230: select third pair $p_{15}$ |
| A1-240: M = 3 pairs selected, do not increment M, end main loop |

Algorithm A1 begins at line A1-100 with a main loop that iterates over M with no pairs selected initially. At line A1-110, M is set to 3 for K=2, and thus (M−K)=1. At line A1-120, evaluation of pairs begins with $p_{12}$, based on the delay order. At line A1-130, risk vector #$p_I$[1] is evaluated using the risk matrix given in Table 3 for $p_{12}$ alone, because no pairs have yet been selected, with the result that all values in risk vector #$p_I$[1] are less than or equal to (M−K). At line A1-140, $p_{12}$ is selected as the first pair. At line A1-150 evaluation of pairs continues with $p_{14}$ based on the delay order. At line A1-160, risk vector #$p_I$[2] is evaluated using the risk matrix given in Table 3 for $p_{12}$ and $p_{14}$, because only $p_{12}$ has yet been selected, with the result that all values in risk vector #$p_I$[2] are less than or equal to (M−K). At line A1-170, $p_{14}$ is selected as the second pair. At line A1-180 evaluation of pairs continues with $p_{13}$ based on the delay order. At line A1-190, risk vector #$p_I$[3] is evaluated using the risk matrix given in Table 3 for $p_{12}$, $p_{14}$, and $p_{13}$, because both $p_{12}$ and $p_{14}$ have been selected, with the result that all values in risk vector #$p_I$[3] are not less than or equal to (M−K). At line A1-200, $p_{13}$ is skipped. At line A1-210 evaluation of pairs continues with $p_{15}$ based on the delay order. At line A1-220, risk vector #$p_I$[4] is evaluated using the risk matrix given in Table 3 for $p_{12}$, $p_{14}$, and $p_{15}$, because both $p_{12}$ and $p_{14}$ have been selected, with the result that all values in risk vector #$p_I$[4] are less than or equal to (M−K). At line A1-230, $p_{15}$ is selected as the third pair. At line A1-240, it is determined that M number of pairs have been selected, thus M is not incremented, and the main loop ends and Algorithm A1 ends having selected {$p_{12}$, $p_{14}$, $p_{15}$} for K-connect survivability.

Algorithm A2—Risk-Based:

In the Delay-Based Algorithm A1, it may be possible that pairs selected earlier are associated with many risks, resulting in more working DCs for satisfying the K-connect constraint. Hence, Risk-Based Algorithm A2 sorts $p_{aj}$ pairs in an increasing order of the total frequency of risks that are associated with $p_{aj}$. The frequency of a risk is defined as the number of $p_{aj}$ pairs that are associated with the risk. Other steps in Risk-Based Algorithm A2 may be similar to certain portions of the Delay-Based Algorithm A1.

Based on the risk matrix generated in Table 3, the following frequency of risks may be established for each pair $p_{ij}$:

$p_{12}$ is associated with risks $S_1$ (1 risk) and $s_2$ (2 risks), so $p_{12}$ frequency of risk 2+1=3;

$p_{13}$ is associated with risks $s_2$, $s_3$, and $s_4$, so $p_{13}$ frequency of risk 2+1+2=5;

$p_{14}$ is associated with risk $s_2$, so $p_{14}$ frequency of risk=2; and $p_{15}$ is associated with risk $s_5$, so $p_{15}$ frequency of risk=1.

Accordingly, the risk order for Algorithm A2 is given by {$p_{15}$, $p_{14}$, $p_{12}$, $p_{13}$}, which represents an order in which pairs $p_{ij}$ are selected for processing.

| Algorithm A2: Risk-based K-connect survivability evaluation in pseudo code. |
|---|
| A2-100: begin main loop iterating over M, no pairs selected |
| A2-110: set number of pairs to select M = 3, so (M − K) = 1 |
| A2-120: evaluate $p_{15}$ based on risk order |
| A2-130: evaluate #$p_I$[1] = {0, 0, 0, 0, 1}, so #$p_I$[1] ≤ (M − K) |
| A2-140: select first pair $p_{15}$ |
| A2-150: evaluate $p_{14}$ based on risk order |
| A2-160: evaluate #$p_I$[2] = {0, 1, 0, 1, 0}, so #$p_I$[2] ≤ (M − K) |
| A2-170: select second pair $p_{14}$ |
| A2-180: evaluate $p_{12}$ based on risk order |
| A2-190: evaluate #$p_I$[3] = {1, 1, 0, 1, 1}, so #$p_I$[3] ≤ (M − K) |
| A2-200: select third pair $p_{12}$ |
| A2-210: M = 3 pairs selected, do not increment M, end main loop |

Algorithm A2 Begins at Line A2-100 with a Main Loop that Iterates Over M with No Pairs Selected Initially. At Line A2-110, M is Set to 3 for K=2, and Thus (M−K)=1. At Line A2-120, evaluation of pairs begins with $p_{15}$, based on the risk order. At line A2-130, risk vector #$p_I$[1] is evaluated using the risk matrix given in Table 3 for $p_{15}$ alone, because no pairs have yet been selected, with the result that all values in risk vector #$p_I$[1] are less than or equal to (M−K). At line A2-140, $p_{15}$ is selected as the first pair. At line A2-150 evaluation of pairs continues with $p_{14}$ based on the risk order. At line A2-160, risk vector #$p_I$[2] is evaluated using the risk matrix given in Table 3 for $p_{15}$ and $p_{14}$, because only $p_{15}$ has yet been selected, with the result that all values in risk vector #$p_I$[2] are less than or equal to (M−K). At line A2-170, $p_{14}$ is selected as the second pair. At line A2-180 evaluation of pairs continues with $p_{12}$ based on the risk order. At line A2-190, risk vector #$p_I$[3] is evaluated using the risk matrix given in Table 3 for $p_{15}$, $p_{14}$, and $p_{12}$, because both $p_{15}$ and $p_{14}$ have been selected, with the result that all values in risk vector #$p_I$[3] are less than or equal to (M−K). At line A2-200, $p_{12}$ is selected as the third pair. At line A2-210, it is determined that M number of pairs have been selected, thus M is not incremented, and the main loop ends and Algorithm A2 ends having selected {$p_{15}$, $p_{14}$, $p_{12}$} for K-connect survivability.

Although both Algorithm A1 and A2 arrive at the same result in the example configuration described above, the Algorithms A1 and A2 may differ in the order in which pairs $p_{ij}$ are evaluated, and thus, may differ in a number of evaluation iterations for a given configuration. It is noted that while additional iterations of the main loop to increment M are not described for descriptive clarity, it will be understood that in larger network configurations, subsequent iterations may be performed to find K-connect survivability for larger values of M.

Figure 3:
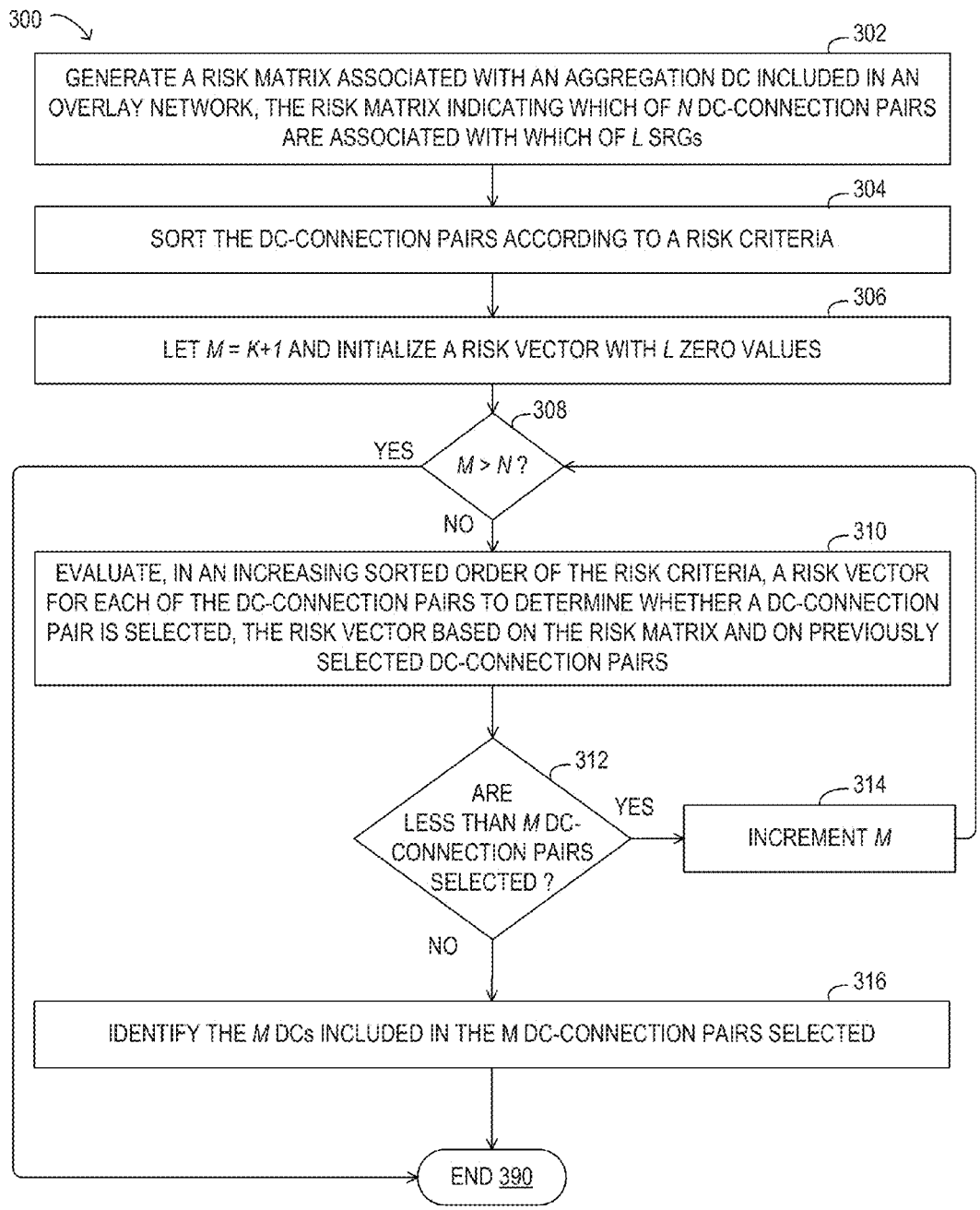
FIG. 3 is a flow chart depicting selected elements of an embodiment of a method for implementing K-connect survivability.

Turning now to FIG. 3, selected elements of an embodiment of method 300 for implementing K-connect survivability, as described herein, is shown in flow chart format. In certain embodiments, method 300 may be implemented using KCS identification 530 (see FIG. 5). It is noted that certain operations depicted in method 300 may be rearranged or omitted, as desired.

Method 300 may begin by generating (operation 302) a risk matrix associated with an aggregation DC included in an overlay network, the risk matrix indicating which of N DC-connection pairs are associated with which of L SRGs. The DC-connection pairs may be sorted (operation 304) according to a risk criteria. The risk criteria may be risk-based or may be delay-based. Then, method 300 may let (operation 306) M=K+1 and may initialize (operation 306) a risk vector with L zero values. Then, a decision may be made (operation 308) whether M>N. When the result of operation 308 is YES, method 300 may end (operation 390). When the result of operation 308 is NO, a risk vector may be evaluated (operation 310), in increasing order of the risk criteria, for each of the DC connection pairs to determine whether a DC-connection pair is selected, the risk vector based on the risk matrix and on previously selected DC-connection pairs. Then, a decision may be made (operation 312), whether less than M DC-connection pairs are selected. When the result of operation 312 is YES, M may be incremented (operation 314) and method 300 may loop back to operation 308. When the result of operation 312 is NO, the M DCs included in the M DC-connection pairs selected may be identified (operation 316). Then, method 300 may end (operation 390).

Figure 4:
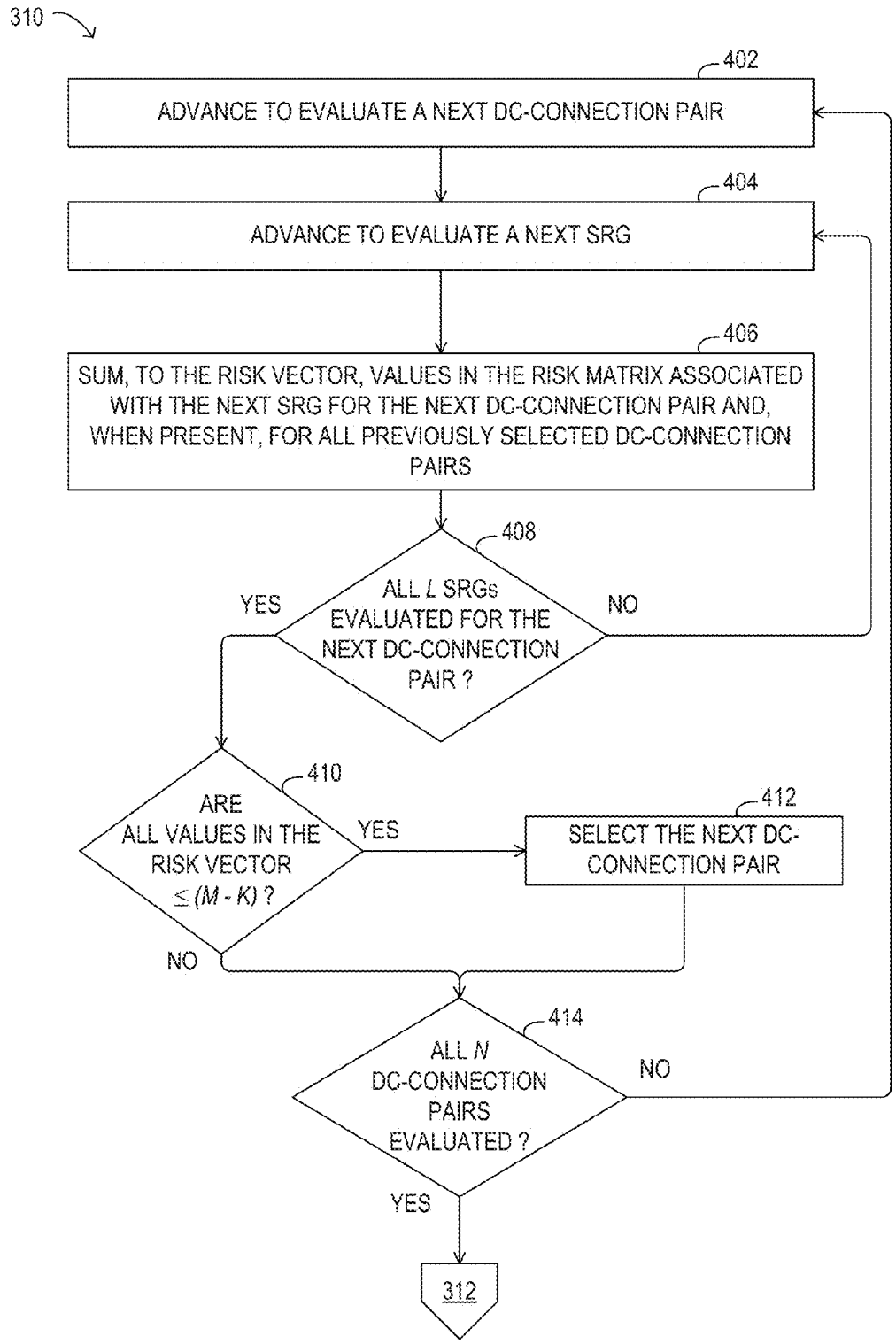
FIG. 4 is a flow chart depicting selected elements of an embodiment of a method for implementing K-connect survivability.

Turning now to FIG. 4, selected elements of an embodiment of method 310 for implementing K-connect survivability, as described herein, is shown in flow chart format. In various embodiments, method 310 may be implemented using KCS identification 530 (see FIG. 5) and may represent operation 310 in method 300 (see FIG. 3). It is noted that certain operations depicted in method 310 may be rearranged or omitted, as desired. Method 310 is described in an iterative loop context and in the description below, the term "next" is used to designate iterative values used within the loop context.

Method 310 may begin by advancing (operation 402) to evaluate a next DC-connection pair. Method 310 may then advance (operation 404) to evaluate a next SRG. Values in the risk matrix associated with the next SRG for the next DC-connection pair and, when present, for all previously selected DC-connection pairs may be summed (operation 406) to the risk vector. Then, a decision may be made (operation 408), whether all L SRGs have been evaluated for the next DC-connection pair. When the result of operation 408 is NO, method 310 may loop back to operation 404. When the result of operation 408 is YES, a decision may be made (operation 410), whether all values in the risk vector are less than or equal to (M−K). When the result of operation 410 is YES, the next DC-connection pair may be selected (operation 412). When the result of operation 410 is NO or after operation 412, a decision may be made (operation 414), whether all N DC-connection pairs have been evaluated. When the result of operation 412 is NO, method 310 may loop back to operation 402. When the result of operation 412 is YES, method 310 may continue to operation 312 (see FIG. 3).

Figure 5:
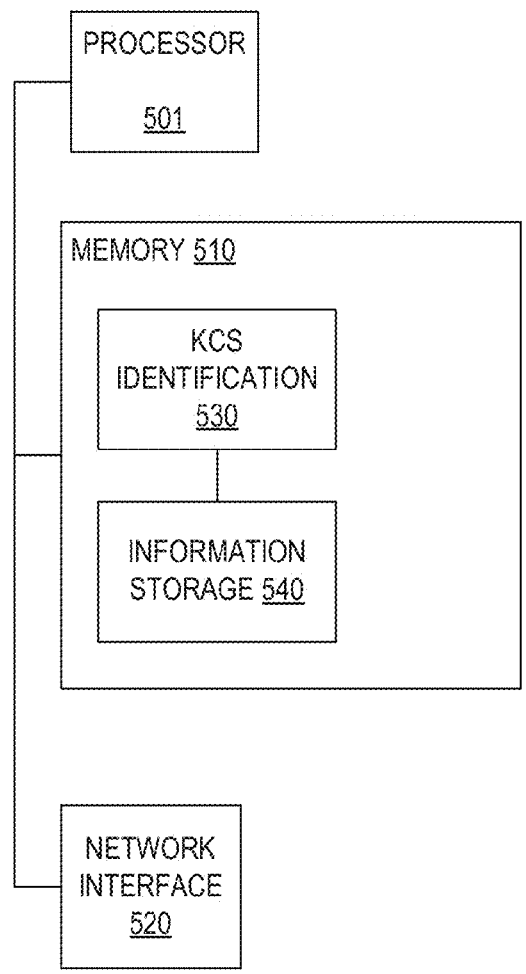
FIG. 5 is a block diagram of selected elements of an embodiment of a management system.

Referring now to FIG. 5, a block diagram of selected elements of an embodiment of management system 500 is illustrated. In FIG. 5, management system 500 is represented as a computer system including physical and logical components for implementing K-connect survivability, as described herein, and may accordingly include processor 501, memory 510, and network interface 520. Processor 501 may represent one or more individual processing units and may execute program instructions, interpret data, and/or process data stored by memory 510 and/or management system 500.

In FIG. 5, memory 510 may be communicatively coupled to processor 501 and may comprise a system, device, or apparatus suitable to retain program instructions and/or data for a period of time (e.g., computer-readable media). Memory 510 may include various types components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, and/or any suitable selection or array of volatile or non-volatile memory. Non-volatile memory refers to a memory that retains data after power is turned off. It is noted that memory 510 may include different numbers of physical storage devices, in various embodiments.

As shown in FIG. 5, memory 510 may include K-connect survivability (KCS) identification 530, which may represent respective sets of computer-readable instructions that, when executed by a processor, such as processor 501, may execute various algorithms for identifying DCs and/or SRGs to satisfy K-connect survivability, including, but not limited to, Risk-Based Algorithm A1 and/or Delay-Based Algorithm A2. Information storage 540 may store various data and parameters, such as data and parameters associated with KCS identification 530.

Turning now to FIGS. 6A-6D, simulation results of embodiments of selected methods for implementing K-connect survivability are shown as data plots. In FIGS. 6A-6D, results of simulations of selected embodiments of the heuristic Algorithms A1 and A2 are shown for comparison. In the simulation results depicted in FIGS. 6A-6D, given a physical network having 75 DCs and 99 connections, fully mesh connected overlay networks, similar to overlay network 100 (see FIG. 1), are generated with DCs located at randomly chosen nodes. The shortest paths for the connections in the overlay network are used with connection delays randomly assigned between 0.1 and 10 arbitrary time units, while a total number of 60 SRG risks are used. The set of risks on each connection and each DC may be randomly chosen, and a number of SRGs per connection or per DC, notated by R, is given in FIGS. 6A-D. For a cloud request, an aggregation DC may be randomly assigned. The simulation results are averaged over a total of $10^5$ requests that are successfully allocated, while an arbitrary amount of bandwidth is assumed for VMs that may be requested without any limitation from an underlying physical network infrastructure, so that a fewest number of working DCs and the delay may be specifically evaluated.

Figure 6A:
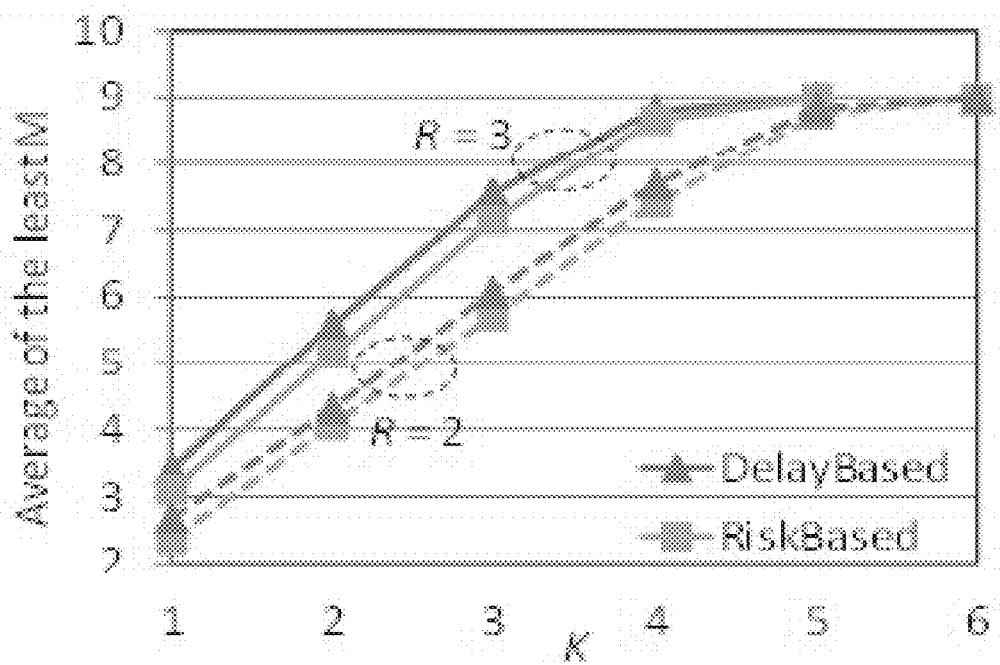
FIGS. 6A-6D are simulation results of embodiments of selected methods for implementing K-connect survivability.
Figure 6B:
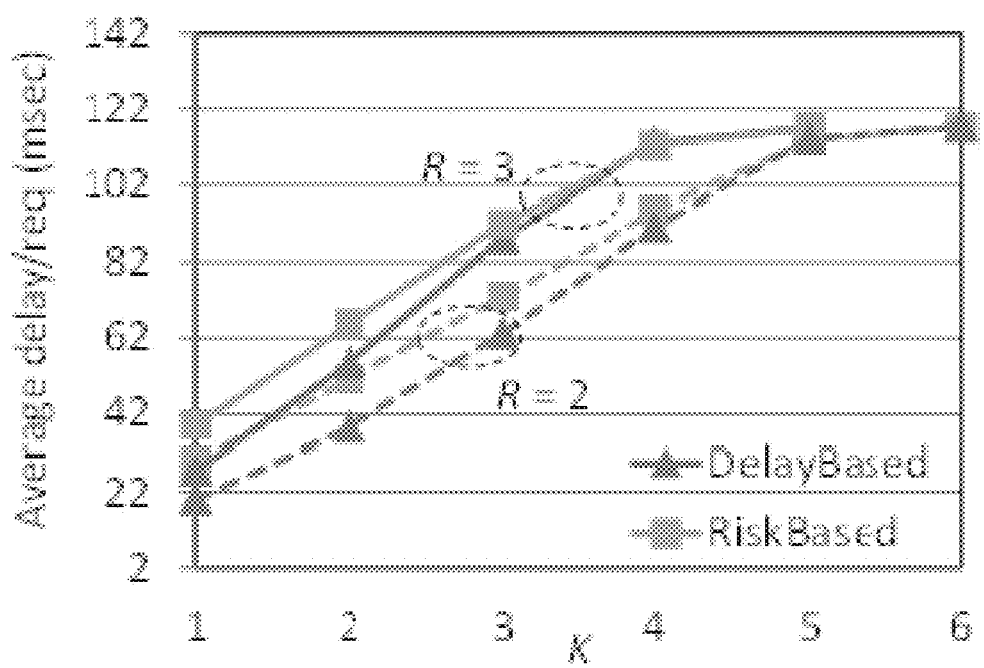

In FIG. 6A, performance for increasing values of K is shown as plots for the average of the least values of M versus K for Algorithm A1 (Delay-Based) and Algorithm A2 (Risk-Based). In FIG. 6B, performance for increasing values of K is shown as plots for the average delay per request versus K for Algorithm A1 (Delay-Based) and Algorithm A2 (Risk-Based). FIGS. 6A and 6B show the least M and the average delay of requests as K increases, where the total number of DCs in an overlay network is ten (N=10). FIG. 6A shows that Risk-Based Algorithm A1 may result in up to 12% fewer working DCs than Delay-Based Algorithm A2. It is noted that, in order to satisfy the increasing K-connect constraint, the fewest number of working DCs increases. When K is equal to 6 (or 4) for R=1 (or R=2), the fewest working DCs required has almost reached 9 out of 10 total DCs. Hence, no solution may be found for higher K. FIG. 6B shows that, as K increases, the average delay per request increases due to the requirement of more working DCs and the difference in delay reduces. When K is lower than (N/(2R)), which shows a high risk diversity of connections, the delay of Risk-Based Algorithm A1 may be higher than the delay of Delay-Based Algorithm A2, even when Risk-Based Algorithm A1 results in fewer working DCs, because a chosen connection with lower total risk frequency may have longer delay. When K is higher than (N/(2R)), there may be limited risk diversity of connections, and thus, limited choices of sets of working DCs. Hence, Risk-Based Algorithm A1 may slightly outperform Delay-Based Algorithm A2 with fewer working DCs, and thus, lower delay.

Figure 6C:
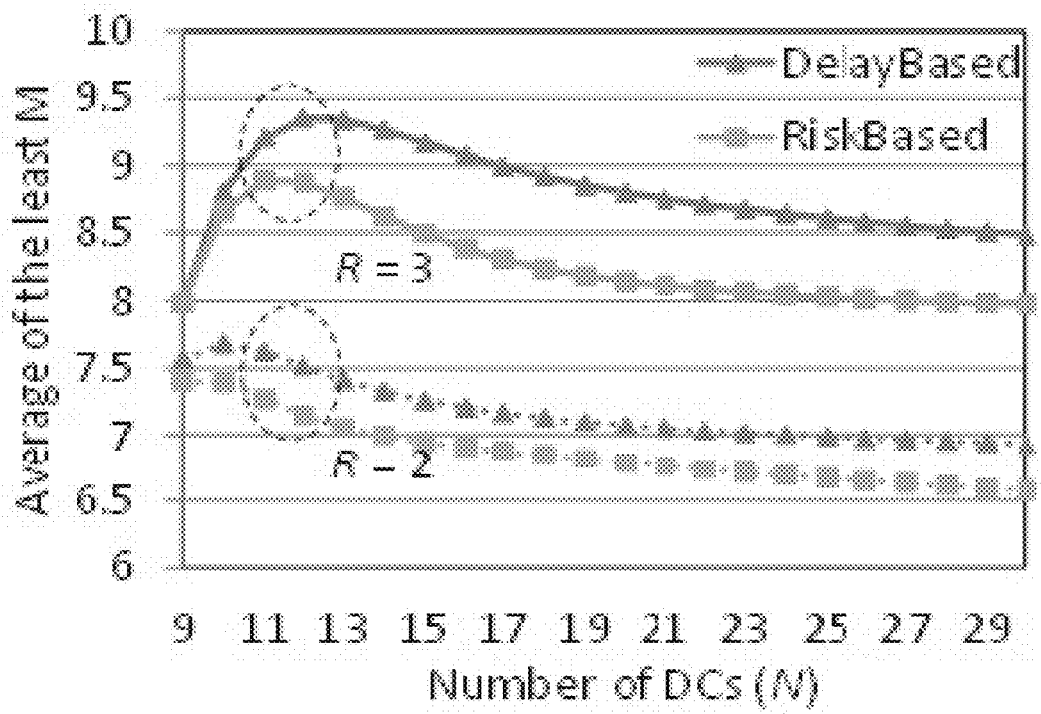
Figure 6D:
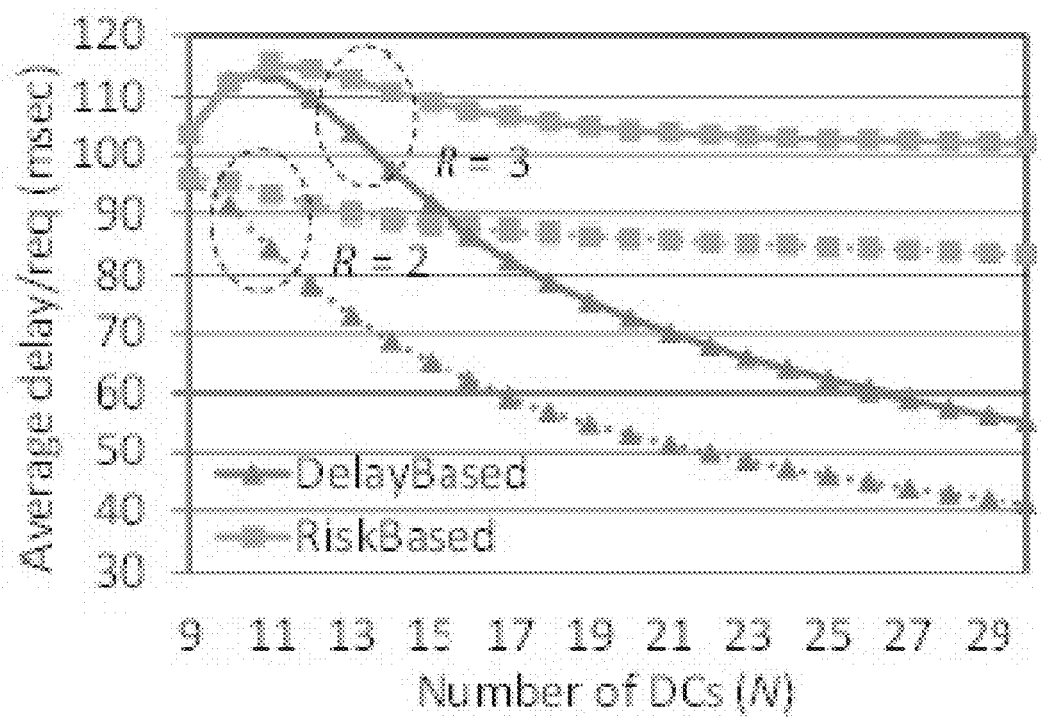

In FIG. 6C, performance for increasing values of N is shown as plots for the average of the least values of M versus N for Algorithm A1 (Delay-Based) and Algorithm A2 (Risk-Based). In FIG. 6D, performance for increasing values of N is shown as plots for the average delay per request versus N for Algorithm A1 (Delay-Based) and Algorithm A2 (Risk-Based). In FIGS. 6C and 6D K is fixed to be 4. Risk-Based Algorithm A1 may result in fewer working DCs and higher delay of requests as N increases, compared to Delay-Based Algorithm A2. In FIG. 6C, for R=2, when N is lower than 16, there is limited diversity of connections (N/(2R)<K=4), thus both algorithms require more working DCs as N increases. When N is higher than 16, the diversity of connections improves, the required number of working DCs reduces as N increases.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A computer-implemented method for identifying a smallest M number of data centers (DCs) for K-connect survivability, the method comprising:
   acquiring, via an application program interface, network information of a physical network;
   generating, using the acquired network information of the physical network, a risk matrix associated with an aggregation DC included in an overlay network representing the physical network, wherein the risk matrix indicates which of N number of DC-connection pairs are associated with which of L number of shared risk groups (SRGs) in the overlay network, wherein a DC-connection pair represents a connection in the overlay network to a DC from the aggregation DC;
   sorting the DC-connection pairs according to a risk criteria; setting M equal to K+1;
   iterating over each value of M: evaluating, in an increasing sorted order of the risk criteria, a risk vector for each of the DC-connection pairs to determine whether a DC-connection pair is selected, wherein the risk vector is based on the risk matrix and on previously selected DC-connection pairs; and when less than M number of DC-connection pairs are selected, incrementing M; and
   identifying the M number of DCs included in the M number of DC-connection pairs selected, wherein K represents a minimum number of DCs that remain accessible to the aggregation DC; and
   allocating, after a failure at one or more of the M number of DCs, virtual machines at the K number of DCs to compensate for a loss of virtual machines caused by the failure at the one or more of the M number of DCs.

2. The method of claim 1, wherein the risk criteria comprises: a network delay value associated with each of the DC-connection pairs.

3. The method of claim 1, wherein the risk criteria comprises: a risk frequency associated with each of the DC-connection pairs, wherein the risk frequency for a first DC-connection pair is defined as a total number of DC-connection pairs that are cumulatively associated with each SRG respectively associated with the first DC-connection pair.

4. The method of claim 1, wherein the risk matrix includes a value of 1 for each SRG associated with a given DC-connection pair and otherwise a value of 0, and further comprising:
   prior to the iterating over each value of M, initializing the risk vector with L number of zero values, wherein the evaluating the risk vector includes: iterating over each SRG for a next DC-connection pair:
   summing, to the risk vector, values in the risk matrix associated with a next SRG for the next DC-connection pair and, when present, for all previously selected DC-connection pairs; and
   when all values in the risk vector are less than or equal to a difference of M minus K (M–K), selecting the next DC-connection pair.

5. The method of claim 1, wherein at least a portion of a network topology associated with the physical network is undefined by the overlay network.

6. The method of claim 5, wherein the acquired network information of the physical network comprises:
   the L number of SRGs; a network delay value associated with each of the DC-connection pairs; and a network bandwidth associated with each of the DC-connection pairs.

7. An article of manufacture for identifying a smallest M number of data centers (DCs) for K-connect survivability, comprising:
   a non-transitory, computer-readable medium; and
   computer executable instructions stored on the computer-readable medium, the instructions readable by a processor and, when executed, for causing the processor to:
   acquire, via an application program interface, network information of a physical network;
   generate, using the acquired network information of the physical network, a risk matrix associated with an aggregation DC included in an overlay network representing the physical network, wherein the risk matrix indicates which of N number of DC-connection pairs are associated with which of L number of shared risk groups (SRGs) in the overlay network, wherein a DC-connection pair represents a connection in the overlay network to a DC from the aggregation DC;
   sort the DC-connection pairs according to a risk criteria;
   set M equal to K+1;
   iterate over each value of M:
   evaluate, in an increasing sorted order of the risk criteria, a risk vector for each of the DC-connection pairs to determine whether a DC-connection pair is selected, wherein the risk vector is based on the risk matrix and on previously selected DC-connection pairs; and
   when less than M number of DC-connection pairs are selected, incrementing M; and
   identifying the M number of DCs included in the M number of DC-connection pairs selected,
   wherein K represents a minimum number of DCs that remain accessible to the aggregation DC;
   and allocate, after a failure at one or more of the M number of DCs, virtual machines at the K number of DCs to compensate for a loss of virtual machines caused by the failure at the one or more of the M number of DCs.

8. The article of manufacture of claim 7, wherein the risk criteria comprises: a network delay value associated with each of the DC-connection pairs.

9. The article of manufacture of claim 7, wherein the risk criteria comprises: a risk frequency associated with each of the DC-connection pairs, wherein the risk frequency for a first DC-connection pair is defined as a total number of DC-connection pairs that are cumulatively associated with each SRG respectively associated with the first DC-connection pair.

10. The article of manufacture of claim 7, wherein the risk matrix includes a value of 1 for each SRG associated with a given DC-connection pair and otherwise a value of 0, and further comprising instructions to:
prior to executing the instructions to iterate over each value of M, initialize the risk vector with L number of zero values, wherein the instructions to evaluate the risk vector include instructions to:
iterate over each SRG for a next DC-connection pair:
sum, to the risk vector, values in the risk matrix associated with a next SRG for the next DC-connection pair and, when present, for all previously selected DC-connection pairs; and when all values in the risk vector are less than or equal to a difference of M minus K, select the next DC-connection pair.

11. The article of manufacture of claim 7, wherein at least a portion of a network topology associated with the physical network is undefined by the overlay network.

12. The article of manufacture of claim 11, wherein the acquired network information of the physical network comprises:
the L number of SRGs;
a network delay value associated with each of the DC-connection pairs; and
a network bandwidth associated with each of the DC-connection pairs.

13. A management system for identifying a smallest M number of data centers (DCs) for K-connect survivability, comprising:
a memory;
a processor coupled to the memory; and processor-executable instructions stored on the memory, the instructions readable by the processor and, when executed, for causing the processor to:
acquire, via an application program interface, network information of a physical network;
generate, using the acquired network information of the physical network, a risk matrix associated with an aggregation DC included in an overlay network representing the physical network, wherein the risk matrix indicates which of N number of DC-connection pairs are associated with which of L number of shared risk groups (SRGs) in the overlay network, wherein a DC-connection pair represents a connection in the overlay network to a DC from the aggregation DC;
sort the DC-connection pairs according to a risk criteria;
set M equal to K+1;
iterate over each value of M:
evaluate, in an increasing sorted order of the risk criteria, a risk vector for each of the DC-connection pairs to determine whether a DC-connection pair is selected, wherein the risk vector is based on the risk matrix and on previously selected DC-connection pairs; and
when less than M number of DC-connection pairs are selected, incrementing M; and
identifying the M number of DCs included in the M number of DC-connection pairs selected,
wherein K represents a minimum number of DCs that remain accessible to the aggregation DC; and
allocate, after a failure at one or more of the M number of DCs, virtual machines at the K number of DCs to compensate for a loss of virtual machines caused by the failure at the one or more of the M number of DCs.

14. The management system of claim 13, wherein the risk criteria comprises:
a network delay value associated with each of the DC-connection pairs.

15. The management system of claim 13, wherein the risk criteria comprises:
a risk frequency associated with each of the DC-connection pairs, wherein the risk frequency for a first DC-connection pair is defined as a total number of DC-connection pairs that are cumulatively associated with each SRG respectively associated with the first DC-connection pair.

16. The management system of claim 13, wherein the risk matrix includes a value of 1 for each SRG associated with a given DC-connection pair and otherwise a value of 0, and further comprising instructions to:
prior to executing the instructions to iterate over each value of M, initialize the risk vector with L number of zero values, wherein the instructions to evaluate the risk vector include instructions to:
iterate over each SRG for a next DC-connection pair:
sum, to the risk vector, values in the risk matrix associated with a next SRG for the next DC-connection pair and, when present, for all previously selected DC-connection pairs; and
when all values in the risk vector are less than or equal to a difference of M minus K, select the next DC-connection pair.

17. The management system of claim 13, wherein at least a portion of a network topology associated with the physical network is undefined by the overlay network.

18. The management system of claim 13, wherein the acquired network information of the physical network comprises: the L number of SRGs; a network delay value associated with each of the DC-connection pairs; and a network bandwidth associated with each of the DC-connection pairs.

* * * * *